(12) United States Patent  
Huffman

(10) Patent No.: US 8,345,229 B2
(45) Date of Patent: Jan. 1, 2013

(54) LONG DISTANCE OPTICAL FIBER SENSING SYSTEM AND METHOD

(75) Inventor: John Sinclair Huffman, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 531 days.

(21) Appl. No.: 12/567,853

(22) Filed: Sep. 28, 2009

(65) Prior Publication Data

US 2011/0075152 A1    Mar. 31, 2011

(51) Int. Cl.
*G01N 21/00* (2006.01)
*G08B 13/00* (2006.01)
*G02B 6/00* (2006.01)
*G01J 1/04* (2006.01)
*G01J 1/42* (2006.01)
*G01J 5/08* (2006.01)

(52) U.S. Cl. ......... 356/73.1; 340/541; 340/565; 385/12; 385/13; 250/227.14

(58) Field of Classification Search .................. None
See application file for complete search history.

(56) References Cited

U.S. PATENT DOCUMENTS

| 4,477,725 A | 10/1984 | Asawa et al. | |
|---|---|---|---|
| 4,591,709 A * | 5/1986 | Koechner et al. | 250/221 |
| 5,021,766 A * | 6/1991 | Genahr et al. | 340/544 |
| 5,094,534 A * | 3/1992 | Cole et al. | 356/479 |
| 5,194,847 A | 3/1993 | Taylor et al. | |
| 5,262,884 A * | 11/1993 | Buchholz | 398/134 |
| 5,355,208 A * | 10/1994 | Crawford et al. | 356/35.5 |
| 5,567,933 A * | 10/1996 | Robinson et al. | 250/227.15 |
| 5,675,674 A * | 10/1997 | Weis | 385/12 |
| 5,737,279 A * | 4/1998 | Carter | 367/173 |
| 5,778,114 A | 7/1998 | Eslambolchi et al. | |
| 6,449,400 B1 | 9/2002 | Watanabe et al. | |
| 7,136,156 B1 | 11/2006 | Quint | |
| 8,073,294 B2 * | 12/2011 | Huffman et al. | 385/12 |
| 8,121,442 B2 * | 2/2012 | Huffman et al. | 385/13 |
| 8,131,121 B2 * | 3/2012 | Huffman | 385/12 |
| 8,144,333 B2 * | 3/2012 | Huffman | 356/480 |
| 2003/0094298 A1 * | 5/2003 | Morrow et al. | 174/48 |
| 2006/0197665 A1 * | 9/2006 | Shibata et al. | 340/557 |
| 2007/0280693 A1 * | 12/2007 | Meyer | 398/79 |
| 2008/0088846 A1 | 4/2008 | Hayward et al. | |
| 2008/0144016 A1 | 6/2008 | Lewis et al. | |
| 2010/0277720 A1 * | 11/2010 | Hammons | 356/73.1 |

* cited by examiner

*Primary Examiner* — Gordon Stock, Jr.

(57) ABSTRACT

A long-distance fiber optic monitoring system having a sensing unit and an analyzer that is remotely located from the sensing unit is provided. The sensing unit comprises a source of optical energy for injecting optical energy into the fiber optical cable and an optical detector configured to detect an optical return signal from the optical fiber. The detected optical return signal is associated with an acoustic signal impinging on the optical fiber. The analyzer receives a signal from the remote sensing unit via the optical fiber that is representative of the optical return signal, and determines a location of a disturbance based at least on the received signal. The representative signal can be transmitted from the remote sensing unit to the analyzer as an optical signal or via a metallic wired included with the optical fiber.

12 Claims, 7 Drawing Sheets

LONG DISTANCE OPTICAL FIBER SENSING SYSTEM AND METHOD

FIELD OF THE DISCLOSURE

The present disclosure relates to optical fiber surveillance systems and methods, and more particularly to methods and systems for monitoring long distances using remote sensing modules.

BACKGROUND

Certain methods and systems of monitoring disturbances and intrusions by optical injecting optical energy into fiber optic cable and detecting the backscattered light are known in the art. However, various technological and practical factors limit the deployment and application of such systems in many environments. One such limitation is the distance that can be monitored by such systems. Additionally, monitoring remote or hard to reach locations can limit the deployment of such monitoring systems.

SUMMARY OF THE DISCLOSURE

In accordance with an embodiment of the present disclosure, a long-distance monitoring system is provided. The monitoring system includes a sensing unit and an analyzer that is remotely located from the sensing unit. The sensing unit comprises a source of optical energy for injecting optical energy into the fiber optical cable and an optical detector configured to detect an optical return signal from the optical fiber. The detected optical return signal is associated with an acoustic signal impinging on the optical fiber. The analyzer receives a signal from the remote sensing unit via the optical fiber that is representative of the optical return signal, and determines a location of a disturbance based at least on the received signal.

In accordance with a further feature of the present disclosure, the remote sensing unit can transmit the representative signal to the analyzer as an optical signal over the optical fiber having a wavelength that is different from a wavelength of the optical return signal. Alternatively, the remote sensing unit can transmit the representative signal to the analyzer via a metallic wire that is included with the optical fiber.

In yet a further feature of the present disclosure, optical regenerators can be included in the fiber optic line between the analysis engine and the remote sensing unit to amplify the optical signal. Furthermore, power to the optical regenerators and/or remote sensing unit can be provided by a power source via a metallic wire included with the optical fiber.

The remote sensing unit can be configured to be submersible thereby allowing long-distance monitoring of large bodies of water. Additionally, when submerged, the remote sensing unit can be water-cooled.

These and other advantages of the disclosure will be apparent to those of ordinary skill in the art by reference to the following detailed description and the accompanying drawings.

DETAILED DESCRIPTION

Figure 1:
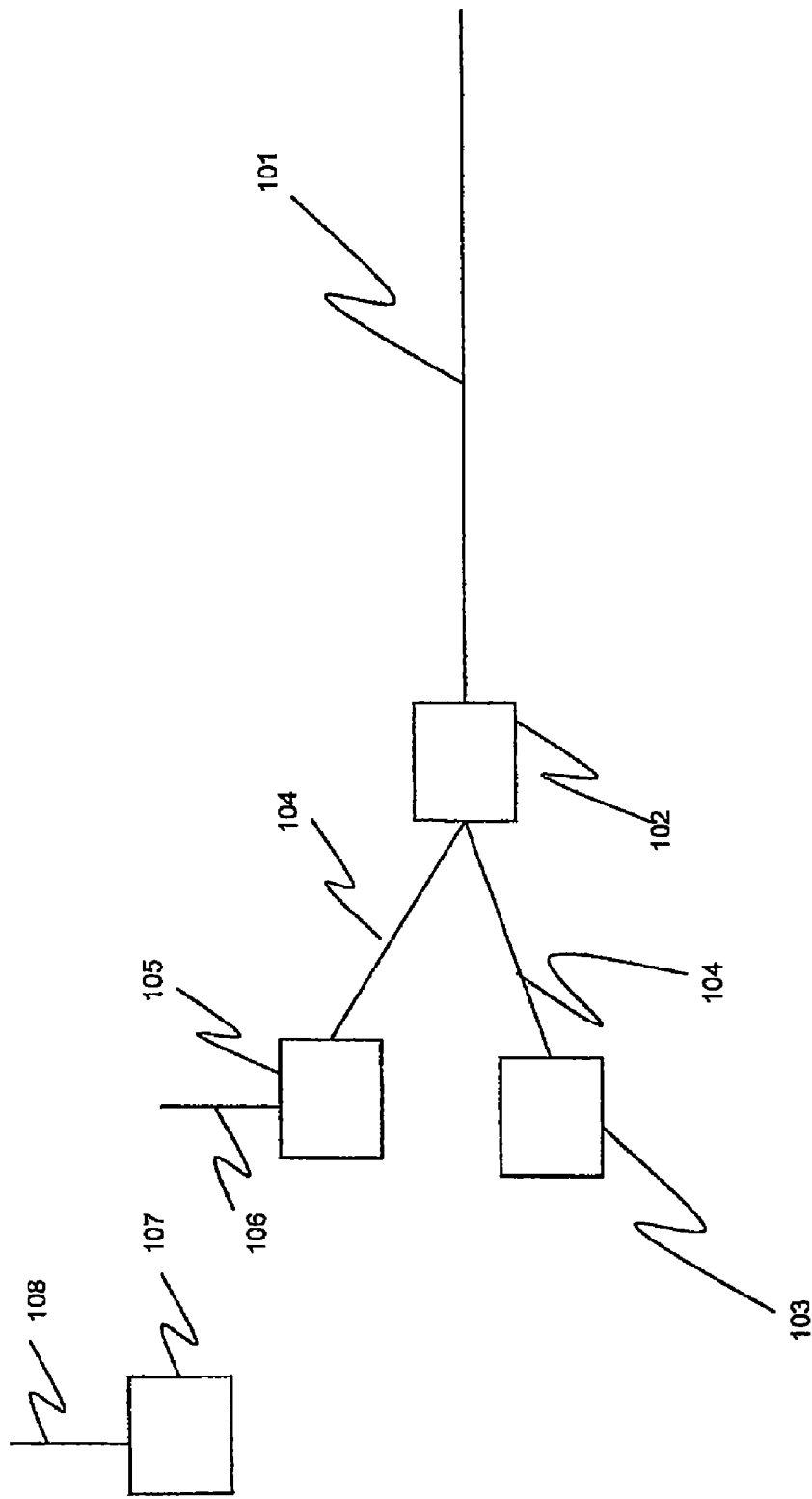
FIG. 1 is a schematic representation of an embodiment of the present disclosure.

FIG. 1 is a schematic representation of a remote fiber surveillance configuration in accordance with one embodiment of the present disclosure. In this Figure, optical energy source 103 injects optical energy into fiber 101. As would be understood by persons having ordinary skill in the art, the source 103 of optical energy can be, for example, a laser. Detector 105 detects the return signal (i.e., the "backscattered signal") emitted from the fiber in accordance with the particular technology used by the surveillance system, such as Raleigh scattering or OTDR technology. As would be understood by persons having ordinary skill in the art, the detector 105 of optical energy can be, for example, a semiconductor photo-detector. Detector 105 can also include the necessary electronics (e.g., an analyzer), such as a digital signal processor, for analyzing the return signal to determine, for example, characteristics of an exemplary acoustic signal impinging upon the fiber at some point along its length. It would be understood that the impinging signal need not be limited to acoustic signals, but can be any type of signal that will affect the optical return signal in a way that can be analyzed by the analyzer to determine characteristics of the impinging signal. Splitter/Combiner 102 injects the optical energy into the fiber and removes the return signal from the fiber. Fiber segments 104 are appropriate fiber segments for bringing the injected and return signals to source 103 and detector 105 respectively. However, the source 103 and detector 105 can be directly connected to the splitter/combiner. It would be understood by persons having ordinary skill in the art that the source 103 of the injected optical signal and the analysis instrumentalities may be included in a single structure.

In one aspect of the present disclosure, the remote fiber surveillance configuration can include a wireless transmitter 105 having an appropriate antenna 106 that transmits a signal to a wireless receiver 107 with appropriate antenna 108. Thus, the remote fiber surveillance system can be deployed in one location and monitored from a different location, optionally in real time, without requiring wired communication with the source 103 and detector 105. For example, the surveillance system could be deployed along various pipelines in Alaska and Texas, but both deployments could be monitored from a central monitoring station in Colorado. It would be understood by one having ordinary skill in the art that antennae 106 and 108, as well as the transmitter 105 and receiver 107 can be of any appropriate configuration and technology for transmitting and receiving wireless signals respectively. The wireless transmitter 105, receiver 107, and antennae 106 and 108 can involve any over-the-air transmission technology. It will be further understood that the analysis instrumentalities can be included in either transmitter 105 and/or receiver 107 and that either or both can be connected to appropriate storage media to save data prior to or after processing. The wireless transmissions can occur continuously to provide continuous monitoring or, in a "sometimes-on" embodiment, can occur periodically or at selected times In an alternative embodiment of the present disclosure, multiple fibers, such as those illustrated in FIG. 1, are deployed, each with their own instrumentalities. The instrumentalities can include networking devices that form a wireless network so that they can interact with each other to more effectively monitor the environment where they are located. Additional instrumentalities can include image equipment such as cameras to aid in the monitoring function.

Figure 2:
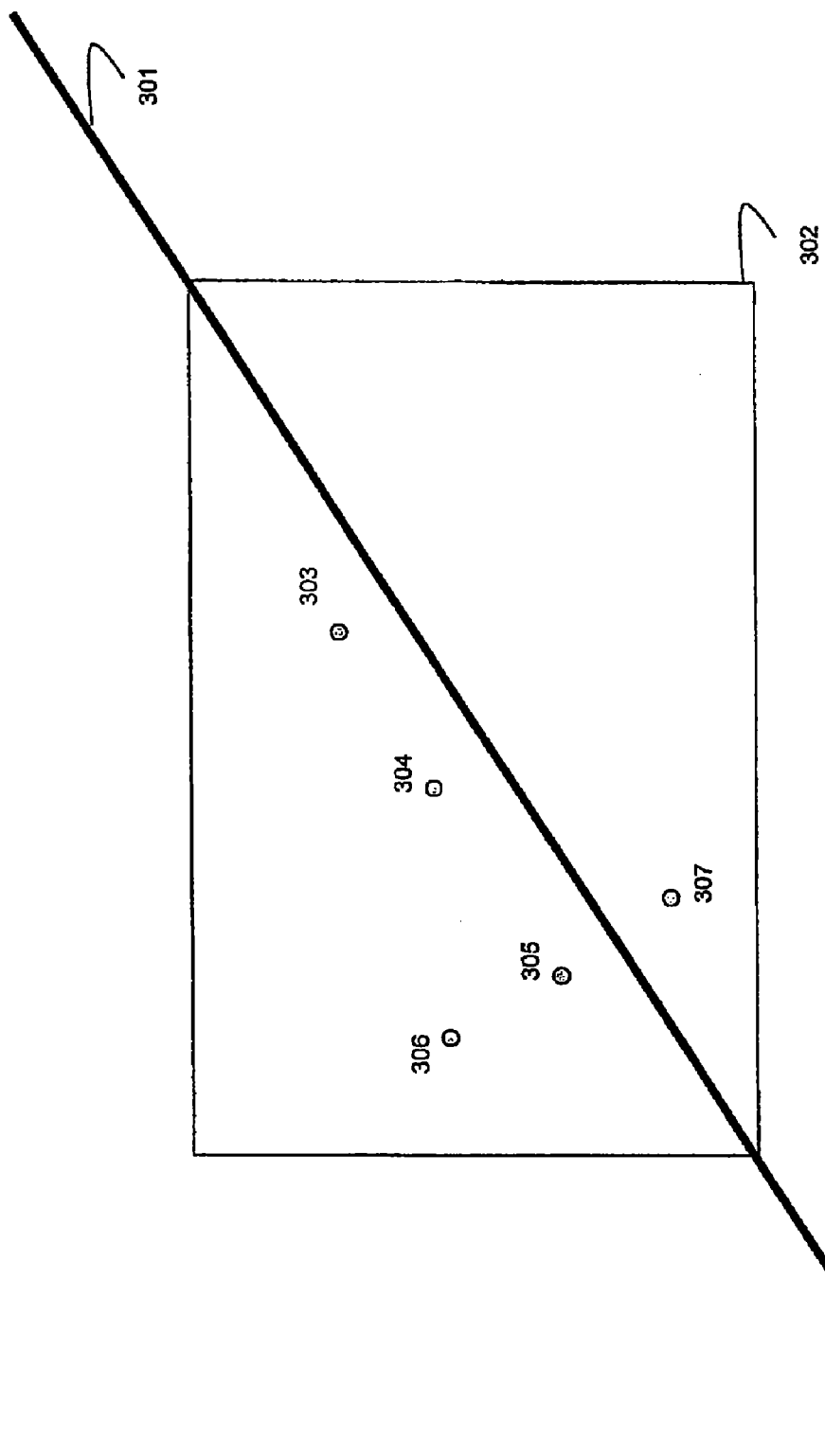
FIG. 2 is a schematic representation of an exemplary fiber topology in accordance with an embodiment of the present disclosure.

FIG. 2 is a schematic representation of a fiber that may be deployed in accordance with the present disclosure over a two dimensional area 302. Fiber 301 is shown, for simplicity, without the instrumentalities shown in FIG. 1. References 303, 304, 305, 306, and 307 (i.e., 303 through 307) are disturbances that are monitored by the fiber surveillance system. References 303 through 307 are, for example, acoustic disturbances that can be detected by the fiber surveillance system. These signals can be in the frequency range of between 20 Hz or 50 Hz on the low frequency side, and 20,000 Hz, 50,000 Hz, or 100,000 Hz on the high frequency side.

The fiber topology illustrated in FIG. 2 is substantially linear and one-dimensional. Because most fiber surveillance and/or monitoring systems locate a disturbance by its lateral distance along the fiber 301, the locations of the disturbances identified as 303, 304, and 305 can be identified and distinguished because they occur at different lateral distances along the fiber 301 (i.e., different distances along the fiber 301 from the optical energy source (not shown)). However, the location of the disturbances 305, 306, and 307 cannot be easily distinguished because they are located at the same lateral distance along the fiber, even though they are displaced perpendicularly from the fiber by different distances. Nevertheless, the locations of disturbances 305 through 307 can be distinguished using a two dimensional, overlapping topology, as discussed in greater detail below in the context of FIG. 3.

Figure 3:
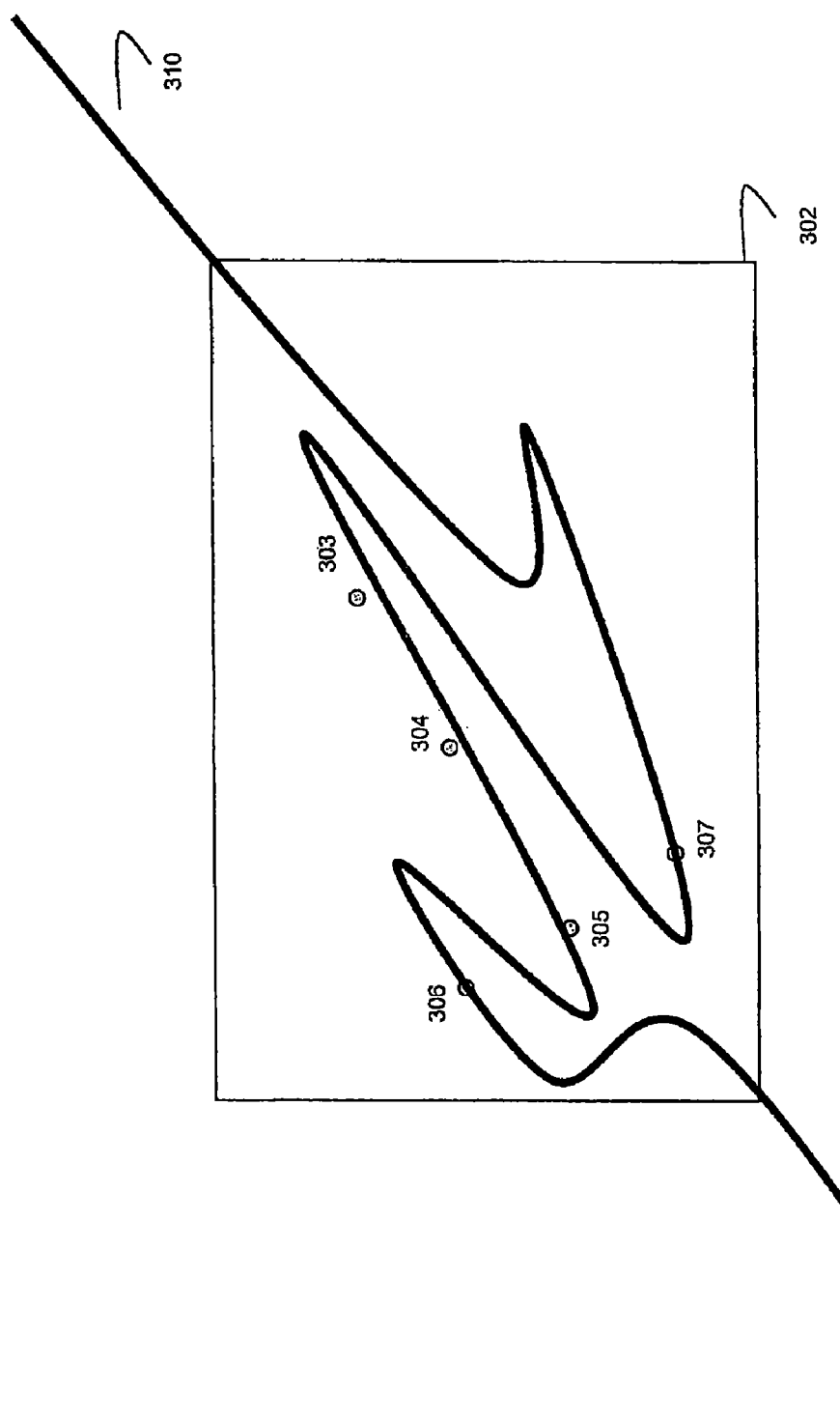
FIG. 3 is schematic representation of an alternative fiber topology in accordance with an embodiment of the present disclosure.

In the embodiment of FIG. 3, the fiber 310 is shown as having a two dimensional topology, rather than the one dimensional, linear topology of the fiber shown in FIG. 2. In this figure, items from FIG. 2 are reproduced with the same numbers. The fiber 310 meanders or serpentines over a two-dimensional surface 302. Accordingly, in this figure, even sources 305 through 307 occur at different distances along the fiber and, therefore, their spatial location can be resolved with much greater accuracy than with the topology shown in FIG. 2.

It will be noted that in the two dimensional topology of FIG. 3 there is greater fiber coverage in a given rectangular area than when the fiber is oriented in single dimensional topology of FIG. 2 (i.e., the system of FIG. 3 includes more fiber in the given area 302 than the system of FIG. 2). It would be understood that in the single dimensional topology of FIG. 2, the greatest length of fiber that can be oriented in the rectangular area 302 is equal to the largest diagonal associated with the area, as in fact is the case in FIG. 2. However, in the two dimensional fiber topology of FIG. 3, a greater length of fiber can be placed in the same rectangular area. Accordingly, in one embodiment of the disclosed, two dimensional topology, the length of fiber oriented in a given rectangular area is greater than the largest diagonal associated with the given area. In alternative embodiments, the length of fiber oriented in a given rectangular area is 10%, 20% or 50% greater than the largest diagonal associated with the rectangular area.

Figure 4:
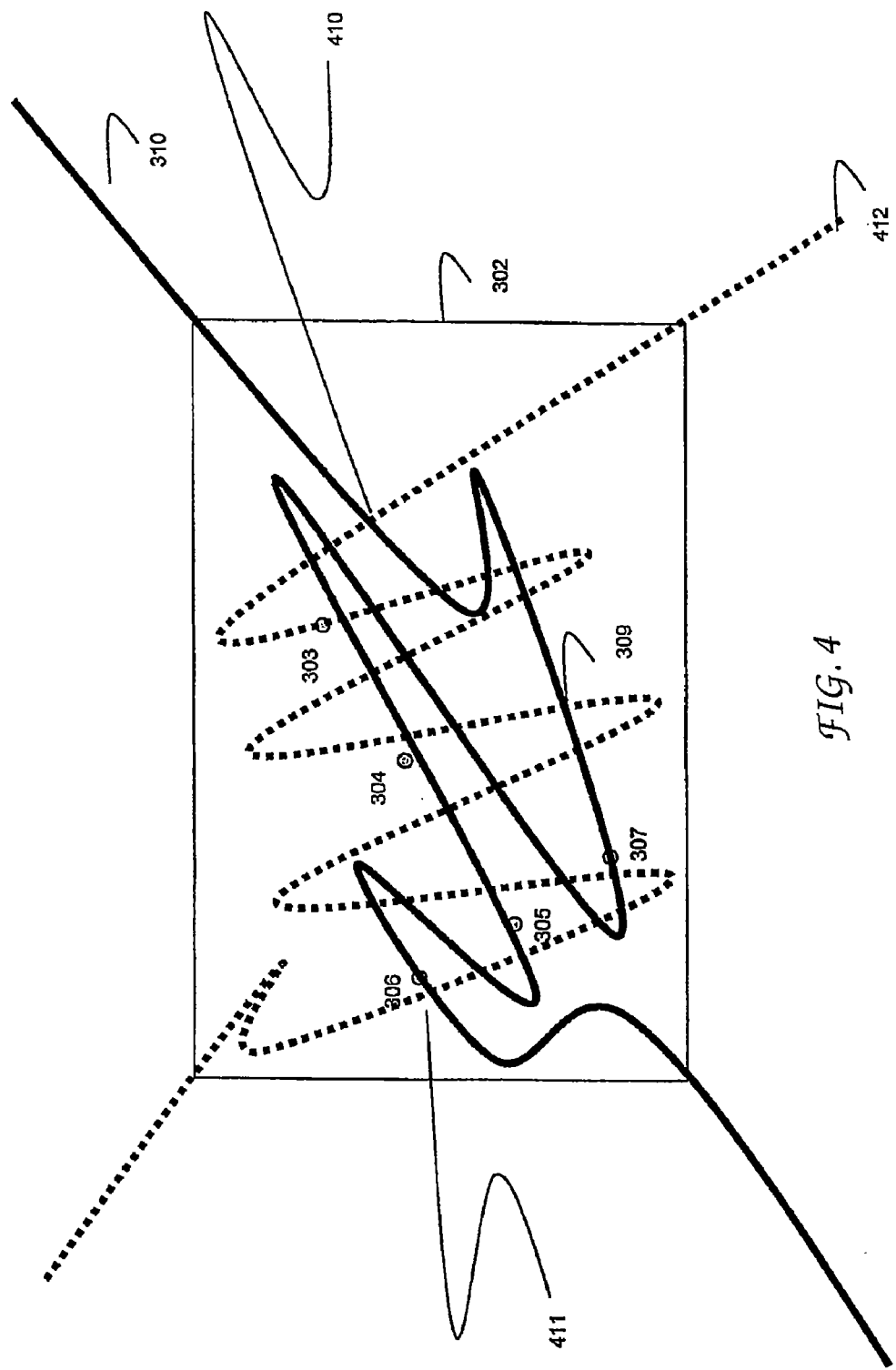
FIG. 4 is schematic representation of yet another alternative fiber topology in accordance with an embodiment of the present disclosure.

Another further application of the disclosed technology is shown in FIG. 4, in which items from FIG. 3 are reproduced with the same identifying numbers. In the topology illustrated in FIG. 4, there are two fibers 310 and 412 each of which is oriented in a two dimensional topology with the two fibers at least partially overlapping each other, with sections oriented approximately perpendicularly to each other. Each of these fibers may have its own source of optical energy, detector, and associated instrumentation as shown for example in FIG. 1. Alternatively, there may be one set of instrumentation which services both fibers.

In FIG. 4, 410 is one of the points where the two fibers overlap. In alternative applications, the fibers overlap at multiple points. It would be understood that the dual fiber topology of FIG. 4 will enable the determination of the spatial location of the various disturbances with much greater resolution because of the two dimensional nature of the topology of each fiber and the overlapping and approximately perpendicular nature of the orientation of the fibers. It will further be understood by persons having ordinary skill in the art that the degree and angle of overlap can vary over a wide range of values.

In FIG. 4, fiber 401 has overlapping points between 410 and 411. The lengths of the fibers from 410 to 411 are the portions of the fiber having overlapping points. That portion is greater, for example, than 10% of the total fiber length. It would be understood that in FIG. 4 any degree of overlap will result in a resolution improvement. While the foregoing discussion has been with reference to two fibers, it would be understood that the number of fibers can vary and any number of fibers may be used to further improve the resolution of the system.

As discussed above, many fiber surveillance technologies determine the location of the disturbance based only on the distance along the fiber of the detected disturbance. This determination is most often made by measuring signal strength as a function of distance along the fiber, as measured for example by delay between the time that the source optical signal is injected into the fiber and the time that the reflected signal is detected. However, when the orientation of the fiber is two-dimensional rather than one dimensional, the exact location (e.g., geographic location, location along a pipeline, etc.) of any point along the fiber may not be known. Accordingly, the location of a disturbance may not be determinable simply based on the distance along the fiber where the disturbance is located. Therefore, it would be advantageous to know the location of points along the fiber as a function of its distance of the points along the fiber. The location of points along the fiber can be determined by imposing a vibration or other acoustic signal at known points along the fiber. In this way, the location of the fiber can be mapped and the distance along the fiber can be associated with a specific location. Such characterization of the fiber location can be accomplished by using, for example, well-known crystal controlled vibrating rods. As the rod is moved relative to the fiber, both along the fiber and perpendicular to it, the signal will be maximum when the rod is exactly over the fiber. In this way, the fiber may be calibrated to determine the exact location of any point along the fiber.

In accordance with a further feature of the present disclosure, not only can the location of a disturbance be determined, but if the source of the disturbance moves, its location can be determined at different times. Accordingly, the path of travel and the velocity of motion, as well as other characteristics of the motion, can be determined. In alternative embodiments of the present disclosure, this information can be used to provide advanced warning not only of unauthorized activity, but of impending collisions between moving objects or between a moving a stationary objects.

It would be understood by those having ordinary skill in the art that the present disclosure can be implemented with any appropriate optical scattering technique, including but not limited to Raleigh scattering and OTDR, and/or any optical signal analysis technique useful in optical surveillance systems As discussed above optical pulses can be launched into buried optical fiber and the backscattered signal detected. The optical frequency of one pulse within a pair of pulses differs slightly from the optical frequency of the other pulse within the pair of pulses. This frequency difference (or separation) itself varies from one pair of pulses to the next. This variation in frequency difference results in a detected backscattered signal having a phase that is modulated by an acoustic signal in the vicinity of the fiber, allowing decoding of the disturbance with improved signal to noise ratio, reduced fading and a linear output.

In the present disclosure, the following definitions apply: The pulses may be considered as individual pulses, pairs of pulses or groups of pulses; The term "launching" includes introducing the pulse into the fiber or transmitting the pulse in the fiber; The term "optical" as used herein may refer to the region of the electromagnetic spectrum that is visible, generally considered to be between approximately 380 nm and 760 nm. However, depending on the application, the term "optical" as used herein can extend into what is sometimes referred to as the infrared and ultraviolet range of the spectrum, for example from 200 nm to 5,000 nm, or 10 nm to 100,000 nm. In any event, the term "optical" will apply to any frequency which is used to transmit data or voice in or through optical fibers; and while the discussion is in terms of an optical fiber, in alternative embodiments pulses outside the optical spectrum may be launched into any appropriate medium that will transmit the pulses.

In a specific embodiment, where the pulses are 20 meters wide, the frequency difference is on the order of 5 MHz and varies by about 5 MHz from one pulse pair to the next. In alternative embodiments, the frequency difference can range from approximately 1 MHz to approximately 5 MHz. For these parameters, each pulse pair results in independent scattering, yielding improved signal to noise ratio. These parameters also result in a relative phase shift of the interference between pulses within each pulse pair on the order of Pi, yielding reduced fading if multiple pulse pairs are used. (Note that it is possible to detect the scattering of each pulse pair from the same section of fiber to within the spatial width of the pulse.)

Both the amplitude and the phase of the beat signal are affected by acoustic disturbances that may be present in the vicinity of the fiber. In one embodiment, the amplitude and phase is extracted from the scattered signal using known complex demodulation techniques. Demodulation is performed at the known frequency difference between pulses in a pair. Such demodulation may be performed by multiplying the reflected signal at the difference frequency by the sine and cosine of the difference frequency. This results in both sinusoidal components and a DC component. For a specific embodiment, a low pass filter with cut-off frequency in the vicinity of 5 MHz isolates the DC component. (Note that if this low pass filter is too narrow it will blur the spatial resolution of the result and if it is too broad it will include the results from the next pair of pulses that may be separated by about 10 MHz yielding a result that is not independent.) The DC component reflects the phase and amplitude of the scattered signal. Rectangular to polar conversion enables the independent determination of the phase and amplitude. The phase will drift relative to the local demodulating signal because of small, slow-varying, changes in environmental parameters. Accordingly, to remove this drift, a high pass filter is used on the phase signal after the rectangular to polar conversion. In this way, only the acoustic signal is observed. Detection techniques that only measure the amplitude suffer from low signal to noise ratio, fading and nonlinearly. The present disclosure, by using pulse pairs with appropriate frequency spacing and by analyzing the phase of the scattered beat signal, results in improved signal to noise ratio, reduced fading, and an output that is linear over a larger dynamic range.

The discussion to this point has focused on a single pulse pair that is transmitted through the fiber. If, for this single pulse pair, we want to look at every 20 meters of fiber, we sample accordingly in time, knowing the time of launch. In analyzing the results, N analysis "bins" may be used, one bin for each 20 meter section of fiber. When multiple pulse pairs are used at some pulse repetition rate then for each bin data will arrive at the pulse repetition rate. A filter is applied to limit the signal to the acoustic band of interest—usually between 1 Hz and 200 Hz for acoustic coupling through the ground or other solid structure. A low pulse repetition frequency limits the maximum acoustic frequency that can be detected without aliasing. A given frequency difference cannot be reused in a second pulse pair until we have observed all of the backscattering from that frequency difference. Accordingly, a given frequency difference cannot be reused until the round trip time within the cable passes. A 2.5 kHz pulse repetition rate is compatible with a cable length of about 25 miles.

There is still an amplitude variation in the observed signal and if the amplitude gets too low, the signal to noise ratio is poor. In those circumstances, the low amplitude result may be disregarded or given low weight. Additionally, a phase unwrap algorithm may be used to obtain greater dynamic range. Because of the discontinuity in arctan as the phase exceeds the range −Pi to +Pi, it is advantageous to add the results at the discontinuity to remove that artifact. If there is no acoustic disturbance, there is no change in the phase and amplitude. If there is an acoustic disturbance, it results in very small local changes in fiber length and a linear change in the phase reflecting linear strain in the fiber.

The duty cycle may be improved by launching pulse pairs with different frequency deltas for the various pulse pairs. In this way, multiple pairs may be propagated in the fiber at one time and their signals can be differentiated by observing the appropriate deltas. The analysis for a second pulse pair is the same as that described above for the first pulse pair except that the demodulating frequency is the new delta. After the high pass filtered phase result is obtained, it is combined with the appropriate bin from the previous pulse—using a time shift reflecting the time difference between the first and second pulse pair. The resultant acoustic signals will add coherently. That is, if the acoustic signal is varying, the detected variation between the first and second pulse pairs will be in phase and add constructively resulting in improved signal to noise ratio. Additionally, if one of the results for the first pulse pair is faded or has low amplitude, the results for the second pulse pair is highly unlikely to show similar effects because of the pi shift in the deltas.

Figure 5:
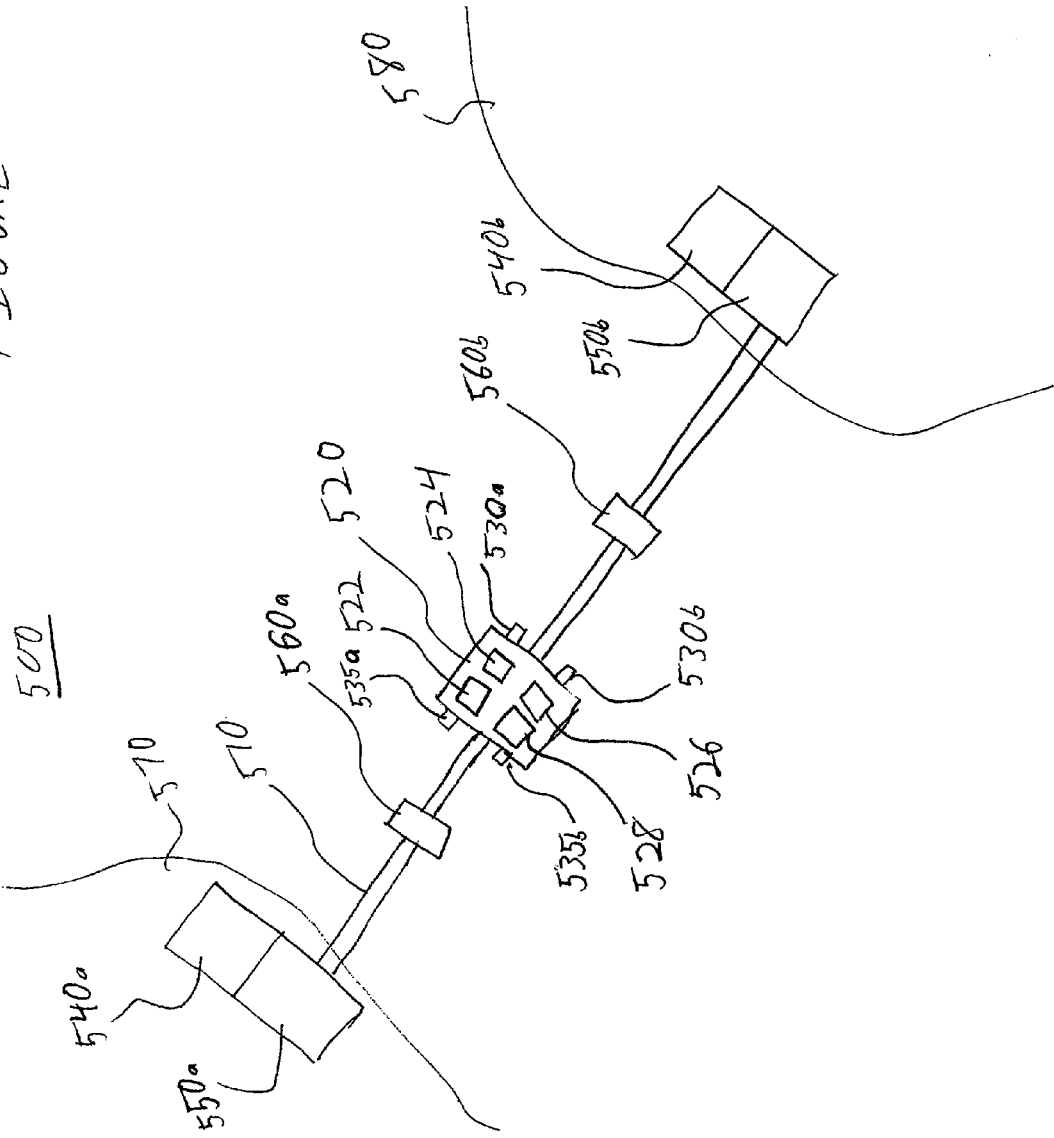
FIG. 5 is a schematic representation of a system in accordance with an embodiment of the present disclosure.

In accordance with a further embodiment of the present disclosure, the fiber surveillance system can be used to for long-distance monitoring, such as distances exceeding the 25-mile cable length limit imposed by a 2.5 kHz pulse repetition rate. FIG. 5 illustrates a schematic of a system 500 in accordance with an embodiment of the present disclosure that enables monitoring of long distances, such as those required by trans-oceanic monitoring.

System 500 includes an optical fiber 510 that is coupled to a remote sensing module 520, a power source 550a, and an analysis engine 540a. The optical fiber 510 also couples the remote sensing module 520 to power source 550b and analysis engine 540b. As illustrated, the power source 550a and analysis engine 540a are on landmass 570, the power source 550b and analysis engine 540b are on landmass 580, and the remote sensing unit is under water between landmass 570 and landmass 580. While illustrated with two power sources 550a and 550b and two analysis engines 540a and 540b, a person of ordinary skill in the art would understand that the system 500 can be operated with a single power source and analysis engine.

The remote sensing unit 520 includes an optical source 522 of energy for injecting optical energy into optical fiber 510 and an optical detector 524 for detecting an optical return signal. As discussed above, the optical return signal is affected by and associated with the acoustic signals impinging on the optical fiber 510, and can therefore be used to locate a disturbance. Because of the long distances monitored by system 500, the sample size of the system can be increased, for example to 200 meters.

The remote sensing unit further includes a communication unit 526 that is configured to transmit a signal representative of the optical return signal to the analyzer 540a or 540b. The representative signal includes the features of the optical return signal that can be used to locate the disturbance. The communication unit 526 communicates this representative sign to the analyzer via the optical fiber 510. In accordance with one feature of the present disclosure, the representative signal can be communicated as an encoded optical signal using a wavelength that is different from the wavelengths used by the source of optical energy 522. In a further feature of the present disclosure, the representative signal can be transmitted over a metallic wire that is included in the optical fiber 510.

The remote sensing unit 520 includes a power subsystem 528 for powering the remote sensing unit 520. Power can be provided to the remote sensing unit 520 via battery. However, batteries have a limited life span. Alternatively, power source 550a and 550b can provide power to the power subsystem 528 via a metallic wire included in the optical fiber 510.

Because of the properties of transmission of an optical signal over a long distance fiber optic cable (e.g., signal loss), regenerators 560a and 560b can be included along the transmission path of optical fiber 510. The regenerators 560a and 560b amplifies the optical signal of the optical fiber to ensure the remote sensing unit 520 can properly analyze the signal. Additional regenerators can be included in the optical fiber span as necessary to amplify the optical signal. Regenerators 560a and 560b can be power by the power source 550a or 550b as supplied via the metallic wire of the fiber optic cable.

Once the analyzer 540a or 540b receives the representative signal, from the remote sensing unit, the location of the disturbance can be determined. As discussed above with respect to FIG. 2, using a single fiber optical cable, the location of the disturbance can only be located with respect to its location perpendicular to the fiber. Thus, in accordance with an embodiment of the present disclosure, multiple optical fibers can be deployed to form a multi-dimensional layout (e.g., a mesh or a grid). In this configuration, as discussed with respect to FIG. 4, a more precise location of the disturbance can be determined. Alternatively, a single fiber can be used, and deployed in a multi-dimensional layout as illustrated in FIG. 3.

Additional optical fibers can be coupled to the same remote sensing unit 520 and optionally provided with an additional source of optical energy and optical detector. Each additional optical fiber provides a respective optical return signal. The remote sensing unit therefore transmits a signal representative of each optical return signal to analysis engines 540a or 540b to determine the location of the disturbance.

In accordance with one application of the present disclosure, disturbances in the water (e.g., boats and submarines) can be detected by deploying system 500 as a trans-oceanic monitoring system. In this embodiment, the remote sensing unit 520 would be submerged. Accordingly, the remote sensing unit must be constructed with an underwater environmental housing capable of withstanding high pressure. In an underwater environment, the remote sensing unit can be adapted for water-cooling. For example, intake ports 530a and 530b allow water to be drawn into the remote sensing unit 520 and expelled through exhaust ports 535a and 535b. The water can be filtered for particular matter and other impurities by intake ports 530a and 530b to prevent damage to cooling system of the remote sensing unit 520.

Figure 6:
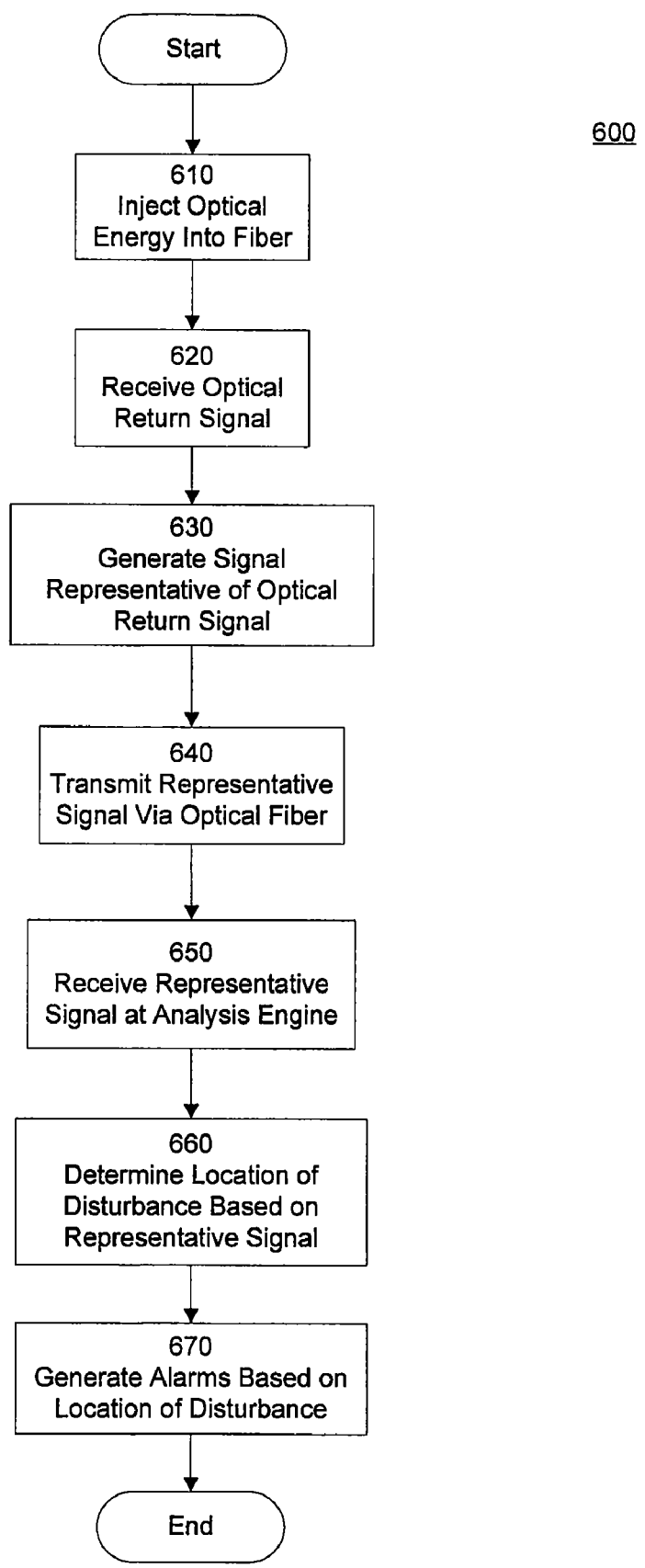
FIG. 6 is a schematic representation of an exemplary methodology used in accordance with an embodiment of the present disclosure.

FIG. 6 illustrates a process 600 for use with the long-distance fiber optic monitoring apparatus described above with respect to FIG. 5. At step 610, the remote sensing 520 unit injects optical energy into the optical fiber 510 being used for long-distance monitoring, and at step 620, the optical return signal is received by the optical detector 524. At step 630, a signal that is representative of the optical return signal is generated. The remote sensing unit 520 transmits the representative signal at step 640 to an analysis engine 540a or 540b via the fiber 510.

At step 650, the analysis engine 540a or 540b receives the representative signal, and at step 660, the location of the disturbance is determined based on an analysis of the representative signal. Configurable alerts/alarms can be generated at step 670 to bring attention to disturbances determined to be in specified locations (e.g., within a certain perimeter or distance from the fiber 510).

Figure 7:
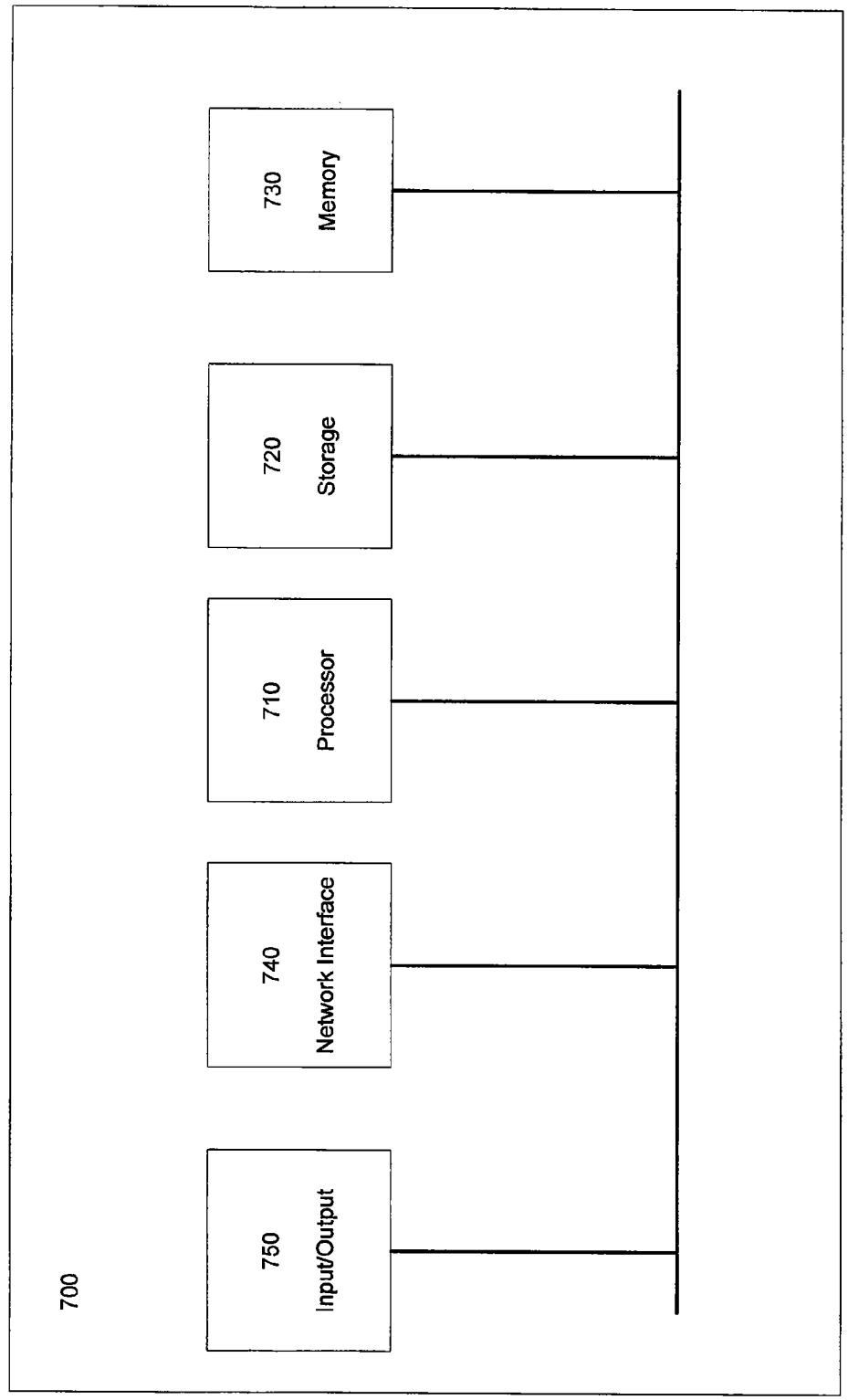
FIG. 7 is a schematic representation of a computer that may be used to implementing methodologies in accordance with the present disclosure.

A high-level block diagram of a computer that may be used to implement the methodology of FIG. 6 is illustrated in FIG. 7. Computer 701 contains a processor 702 which controls the overall operation of the computer 701 by executing computer program instructions which define such operation and implement the methodology of FIG. 6. The computer program instructions may be stored in a storage device 703, or other computer readable medium (e.g., magnetic disk, CD ROM, etc.), and loaded into memory 704 when execution of the computer program instructions is desired. Thus, the method steps of FIG. 6 can be defined by the computer program instructions stored in the memory 704 and/or storage 703 and controlled by the processor 702 executing the computer program instructions. For example, the computer program instructions can be implemented as computer executable code programmed by one skilled in the art to perform an algorithm defined by the method steps of FIG. 6. Accordingly, by executing the computer program instructions, the processor 702 executes an algorithm defined by the method steps of FIG. 6. The computer 701 also includes one or more network interfaces 705 for communicating with other devices via a network. The computer 701 also includes input/output devices 706 (e.g., display, keyboard, mouse, speakers, buttons, etc.) that enable user interaction with the computer 701. One skilled in the art will recognize that an implementation of an actual computer could contain other components as well, and that FIG. 7 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the invention. Those skilled in the art could implement various other feature combinations without departing from the scope and spirit of the invention.

I claim:

1. A long-distance monitoring system comprising:
   a first optical fiber;
   a sensing unit comprising:
      a first source of optical energy configured to inject optical energy into the first optical fiber; and
      a first optical detector configured to detect a first optical return signal from the first optical fiber, the first optical return signal associated with an acoustic signal impinging on the first optical fiber;
   an analyzer remote from the sensing unit and configured to receive a first signal via the first optical fiber representative of the first optical return signal from the remote sensing unit and determine a location of a disturbance based on the first signal using a multi-dimensional layout, wherein the analyzer determines the location of the disturbance using the acoustic signal, wherein if a source of the disturbance moves, the location of the disturbance is determined at various times, and wherein the optical energy injected into the first optical fiber has a wavelength that is different from a wavelength of the first signal;
   a communication unit configured to transmit one of:
      the first signal over the first optical fiber at the wavelength of the first optical fiber that is different from the wavelength of the first signal to the analyzer; and
      the first signal over a first metallic wire of the first optical fiber to the analyzer;
   a power source remote from the sensing unit and configured to provide power over a second metallic wire; and
   a power subsystem configured to receive the power via the second metallic wire.

2. The system of claim 1, further comprising at least one a regenerator connected to the first optical fiber.

3. The system of claim 1, further comprising:
   a second optical fiber,
   wherein the remote sensing unit further comprises:
   a second source of optical energy configured to inject optical energy into the second optical fiber, and
   a second optical detector configured to detect a second optical return signal from the second optical fiber, the second optical return signal associated with the acoustic signal impinging on the second optical fiber, and
   wherein the analyzer is further configured to receive signals representative of the second optical return signal from the remote sensing unit and determine the location of the disturbance based on the signals representative of the second optical return signal.

4. The system of claim 1, wherein the first optical fiber is longer than 25 miles.

5. The system of claim 1, wherein the remote sensing unit is configured to be submersible.

6. The system of claim 5, wherein the remote sensing unit further comprises a cooling subsystem for water-cooling the remote sensing unit.

7. A method for determining the location of a source of acoustic energy over long-distances comprising:
   injecting optical energy into a first optical fiber at a remote sensing unit;
   receiving at the remote sensing unit, from the first optical fiber, a first optical return signal, the first optical return signal associated with an acoustic signal impinging on the first optical fiber;
   transmitting from the remote sensing unit a first signal representative of the first optical return signal from the remote sensing unit to an analyzer for determination of the location of the disturbance based on the first signal using a multi-dimensional layout, wherein the analyzer determines the location of the disturbance using the acoustic signal, wherein if a source of the disturbance moves, the location of the disturbance is determined at various times, and wherein the optical energy injected into the first optical fiber has a wavelength that is different from a wavelength of the first signal;
   transmitting one of:
      the first signal over the first optical fiber at the wavelength of the first optical fiber that is different from the wavelength of the first signal to the analyzer; and
      the first signal over a first metallic wire of the first optical fiber to the analyzer; and
   receiving power over a second metallic wire of the first optical fiber.

8. The method of claim 7, further comprising regenerating an optical signal transmitted via the first optical fiber at a regenerator.

9. The method of claim 7, further comprising:
   injecting at the remote sensing unit optical energy into a second optical fiber;
   receiving at the remote sensing unit from the second optical fiber a second optical return signal associated with the acoustic signal impinging on the second optical fiber;
   transmitting from the remote sensing unit a second signal representative of the second optical return signal from the remote sensing unit to the analyzer for determination of the location of the disturbance based on the second signal representative of the second optical return signal.

10. The method of claim 7, wherein the first optical fiber is longer than 25 miles.

11. The method of claim 7, wherein the remote sensing unit is configured to be submersible.

12. The method of claim 11, further comprising water-cooling the remote sensing unit.

* * * * *